J. O'DONALD.
Churn.

No. 52,066.

Patented Jan'y 16, 1866.

Witnesses
C. D. Smith
Jas. L. Erwin

Inventor
James O'Donald
By Munn & Co
Attorneys

N. PETERS, Photo-Lithographer, Washington, D. C.

United States Patent Office.

JAMES O'DONALD, OF CLINTON, ILLINOIS.

IMPROVEMENT IN CHURNS.

Specification forming part of Letters Patent No. 52,066, dated January 16, 1866.

*To all whom it may concern:*

Be it known that I, JAMES O'DONALD, of Clinton, in the county of De Witt and State of Illinois, have made new and useful Improvements in Churns; and I do hereby declare the following to be a full, clear, and exact description of the nature, construction, and operation of the same, sufficient to enable one skilled in the art to which it appertains to construct and use the same, reference being had to the accompanying drawings, which are made part of this specification, and in which—

Figure 1:
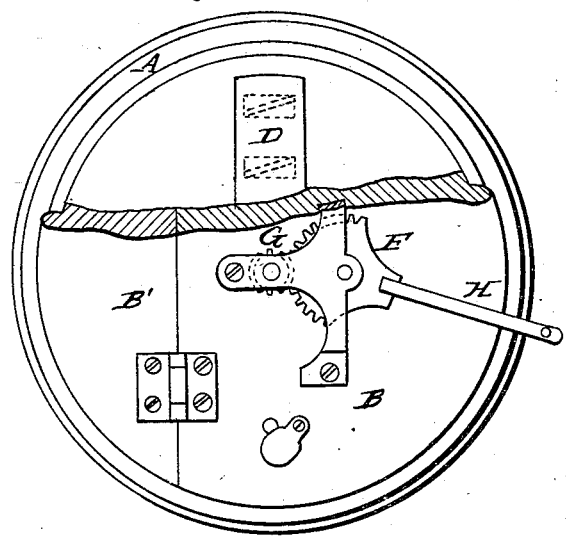
Figure 2:
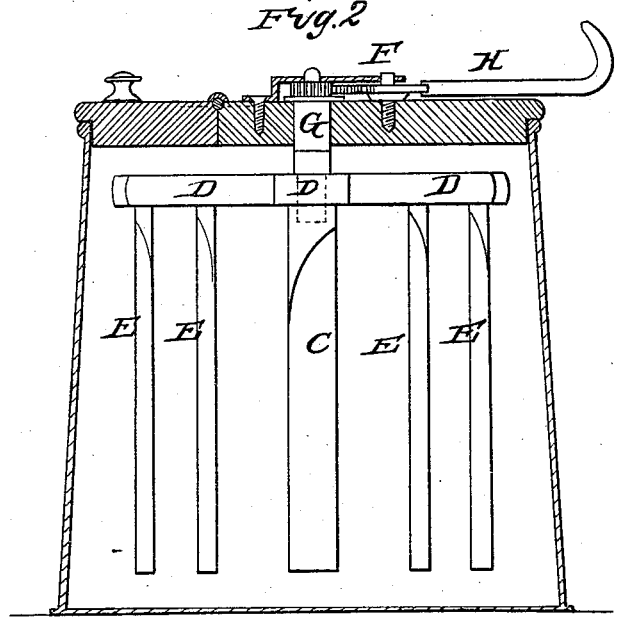

Figure 1 is a top view. Fig. 2 is a central vertical section.

The improvement consists in the construction of the dasher, which consists of a number of slats, bars, or parallels, two or more, attached to the revolving shaft and standing at an angle therewith, so that their sides shall not be concentric or tangential with their circles of revolution, but shall bear against the milk or cream, so as to throw it outward or inward, according as they are rotated, and so by pressure and agitation accomplish the object— the churning of the cream or milk, as the case may be.

In the drawings, A is the vessel, and B B' the jointed lid. C is the shaft of the dasher, which is journaled in the lid and carries arms D, from which depend beaters E, which are set at an angle more or less than a right angle with the arm, so as to expose a flat side obliquely to the cream during the revolution.

The dasher is revolved by means of a segment-rack, F, which engages with a pinion, G, on the shaft, and by the reciprocating motion of the lever H the dasher is alternately revolved in either direction, in one case throwing the cream in a curling stream against the sides of the churn, and by the reversal of the motion throwing it inward, the change of motion, as the motions themselves, producing an extreme agitation of the cream.

The churn itself may be used as a vessel for holding the cream, as all the various parts are connected to the lid, the dasher having no immediate bearing upon the vessel itself.

Having described my invention, what I claim therein as new, and desire to secure by Letters Patent, is—

The construction of the dasher with two or more slats attached thereto and standing at an angle with the dasher-shaft, so as in their revolution to whirl the cream inwardly or outwardly, according to the direction in which they are rotated, substantially as described.

To the above specification of my improvement in churns I have signed my hand this 31st day of October, A. D. 1865.

JAMES O'DONALD.

Witnesses:
C. D. SMITH,
EDWARD H. KNIGHT.